(12) United States Patent
Kyrtsos

(10) Patent No.: US 6,204,773 B1
(45) Date of Patent: Mar. 20, 2001

(54) MERCURY VIBRATION WARNING SWITCH

(75) Inventor: Christos T. Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/250,354

(22) Filed: Feb. 16, 1999

(51) Int. Cl.[7] ................................................ G08B 21/00
(52) U.S. Cl. ...................... 340/689; 340/683; 340/682; 340/440; 340/441; 340/438
(58) Field of Search ........................ 340/686.3, 440, 340/441, 438, 425.5, 683, 682

(56) References Cited

U.S. PATENT DOCUMENTS

| | | | |
|---|---|---|---|
| 4,838,077 | * 6/1989 | Shifflet et al. ................. | 73/118.1 |
| 4,953,110 | * 8/1990 | Chartrand ...................... | 364/550 |
| 5,033,010 | * 7/1991 | Lawrence et al. .............. | 364/550 |
| 5,056,237 | * 10/1991 | Saunders ........................ | 33/645 |
| 5,197,010 | * 3/1993 | Andersson ..................... | 364/463 |
| 5,419,192 | * 5/1995 | Maxwell et al. ................ | 73/462 |
| 5,561,610 | * 10/1996 | Schricker et al. .............. | 364/551.01 |
| 5,621,165 | * 4/1997 | Miura et al. ................... | 73/54.27 |
| 5,793,649 | * 8/1998 | Take et al. ..................... | 364/550 |

* cited by examiner

*Primary Examiner*—Jeffery A. Hofsass
*Assistant Examiner*—Hung Nguyen
(74) *Attorney, Agent, or Firm*—Carlson, Gaskey & Olds

(57) ABSTRACT

A drive line vibration sensor includes a mercury switch, a controller, and a warning device. The mercury switch is preferably positioned such that it is minimally affected by radial acceleration yet remains sensitive to longitudinal accelerations along the longitudinal axis of a drive line. To minimize the affect of radial acceleration, the mercury switch is attached to the drive line such that the mercury switch is tilted relative to the longitudinal axis such that the radial acceleration of the drive line does not activate the mercury switch. If the mercury switch experiences a predetermined acceleration, the controller identifies that the mercury switch is activated and the controller then awakes and activates a transmitter, such as a radio frequency (RF) transmitter to send a signal to a remote warning device such as a warning light.

15 Claims, 1 Drawing Sheet

MERCURY VIBRATION WARNING SWITCH

BACKGROUND OF THE INVENTION

The present invention relates to an apparatus for detecting drive line system imbalances, and more particularly to a drive line vibration sensor which activates a warning when the drive line experiences a predetermined level of vibration.

A drive shaft typically includes an elongated tubular member which is operatively coupled to the transmission and axle assembly through a pair of universal joints or other similar coupling disposed on either end of the shaft. Alternatively, the drive shaft may include two or more elongated tubular members which are connected together by a universal joint or some other similar coupling device and connected between the transmission and wheel assembly.

The individual components of the drive line system discussed above often include inherent or residual imbalances due to variations in manufacturing tolerances. While steps can be taken to balance the individual components, residual imbalances often still remain. It is further known to balance the drive line system prior to, and after, installation into the vehicle. Typically, such balancing is effective to practically eliminate objectional vibration in the drive line system of a fully assembled vehicle. However, mechanical wear, residual imbalances, and road conditions may eventually lead to the disruption of the drive line balance. Vehicle drive line systems which become unbalanced are unacceptable as they produce drive line vibrations which could eventually lead to failure.

Accordingly, it is desirable to provide a vibration sensor which alerts an operator of the drive line imbalances as early as possible to prevent drive line damage from system vibration.

SUMMARY OF THE INVENTION

The vibration sensor of the present invention is preferably fabricated using micro machining technology such that the sensor is preferably fabricated as an integrated circuit chip. Accordingly, the micro machined vibration sensor can be readily located in many small inaccessible locations of a vehicle drive line. The vibration sensor of the present invention generally includes a mercury switch, a controller, and a warning device.

The mercury switch is preferably positioned such that it is minimally affected by radial acceleration yet remains sensitive to longitudinal accelerations along the longitudinal axis of a drive line. To minimize the affect of radial acceleration, the mercury switch is preferably attached to the drive line such that the mercury switch is tilted relative to the longitudinal axis such that the radial acceleration of the drive line does not activate the mercury switch. Further, the switch is positioned such that a predetermined amount of vibration, or acceleration, is necessary to activate the switch. When the switch experiences the predetermined vibration level, a circuit is completed. To further reduce the affect of radial acceleration causing false alarms, the controller is preferably programmed to communicate with the mercury switch above a predetermined radial acceleration.

In the mercury switch experiences a predetermined acceleration, the controller identifies that the mercury switch is activated and the controller activates a warning device. In the preferred embodiment, the controller awakes and activates a transmitter, such as a radio frequency (RF) transmitter which sends a signal to a remote warning device such as a warning light.

To maintain the vibration sensor in an operable state for long periods of inactivity, the transmitter is preferably maintained in a dormant state until the controller "awakens" the transmitter in response to the mercury switch activation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
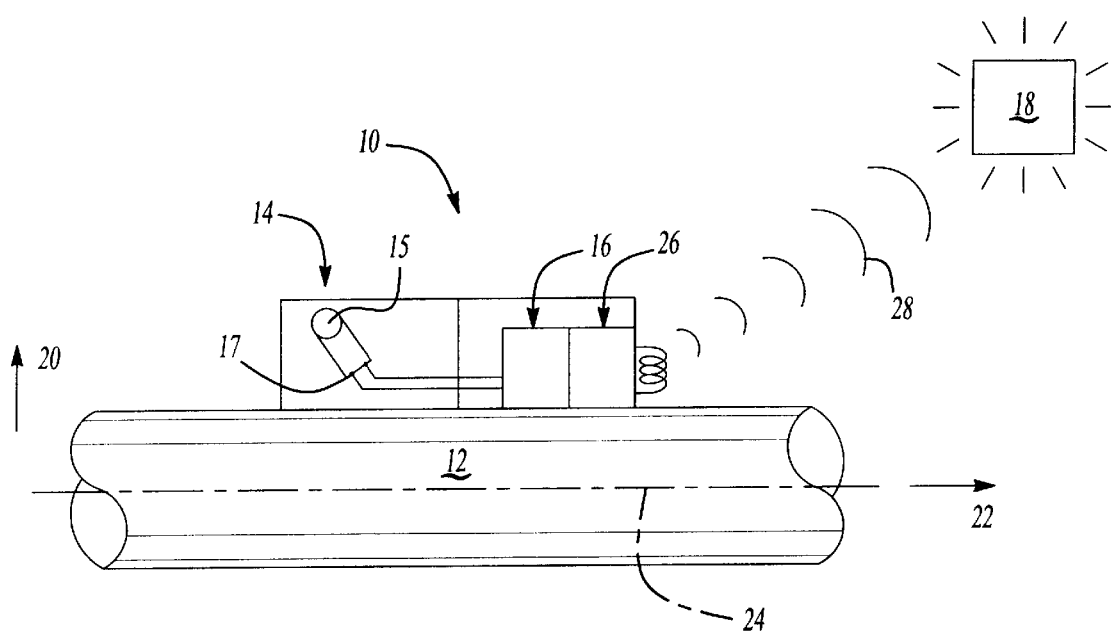
FIG. 1 is a general schematic representation of the driveline vibration sensor according to the present invention.

FIG. 1 illustrates a vibration sensor 10 according to the present invention. The vibration sensor 10 is preferably attachable or integral to a drive line (shown rather schematically at 12) such as a drive shaft, connecting shaft, half-shaft or the like. The sensor 10 of the present invention is equally applicable to other types of rotating machinery or bearings which tend to become unbalanced and eventually produce undesirable vibrations.

The vibration sensor 10 of the present invention is preferably fabricated using micro machining technology in accordance with known integrated circuit technology. Although a single vibration sensor 10 is shown and described, one skilled in the art will realize that a plurality of vibration sensors 10 could be located in various locations and positions along the drive line 12 to identify vibrations from multiple locations and along several axises.

The vibration sensor 10 generally includes a mercury switch 14 and a controller 16. As will be more full described below, the mercury switch 14 is activatable by a predetermined acceleration of the drive line 12. The acceleration is due to a related vibration level. The controller 16 identifies whether the mercury switch becomes activated and then activates a warning device 18 to alert an operator.

The mercury switch 14 is preferably positioned such that it is minimally affected by radial acceleration (shown schematically by arrow 20) yet, remains sensitive to longitudinal accelerations (shown schematically by arrow 22) along the longitudinal axis 24 of a drive line 12. To minimize the affect of radial acceleration 20, the mercury switch 14 is preferably attached to the drive line 12 such that the mercury switch 14 is tilted relative to the longitudinal axis 24 such that the radial acceleration 20 of the drive line 12 does not activate the mercury switch 14. By strategically tilting the mercury switch 14, the longitudinal acceleration amount required to activate the sensor 10 can be established.

To further reduce the affect of radial acceleration 20 causings false alarms, the controller 16 is preferably programed to communicate with the mercury switch 14 only above a predetermined radial acceleration. Whereas the mercury switch 14 is preferably tilted as described above, once the rpm of the drive line 12 falls below a predetermined limit the radial acceleration decreases to the extent that the mercury switch 14 will become activated and cause a false alarm. Thus, to prevent the false alarm, the controller 16 simply ignores whether the mercury switch 16 is activated below the predetermined radial acceleration. In other words, the radial acceleration 20 holds the mercury 15 in the mercury switch 14 in place under normal operating conditions of the drive line 12. Accordingly, the absence of a sufficient radial acceleration 20 during start-up and shutdown activates the mercury switch 14 presenting a false alarm. Additionally, a verification signal can be sent to an operator by the controller 16. During start-up when the radial acceleration 20 is beginning to increase, the controller 16 can perform a self check and signal that the sensor 10 is operable. That is, at start up, a signal should be generated due to the low level. If not, a determination may be made that there is a system fault.

If the sensor 10 experiences a predetermined longitudinal acceleration 22, the mercury switch 14 is triggered. The mercury switch 14 is triggered by the mercury 15 within the mercury switch 14 closing a contact 17 to complete a circuit. Mercury switches are commonly known and the details of such a switch will not be described here. However, convention and micro machined mercury switches are contemplated and equally applicable to the present invention.

It should be understood that the mercury switch will only keep the circuit closed for a short period of time. Thus, the output of the mercury witch at actuation is a spike. The edge of the spike is easy to identify at the control. The controller 16 identifies the mercury switch 14 activation and the warning device 18 is activated by the controller 16 (assuming the drive line 12 is above the predetermined radial acceleration). In the preferred embodiment, the controller 16 awakes and activates a transmitter 26, such as a radio frequency (RF) transmitter which sends a signal 28 to a remote warning device 18.

To maintain the vibration sensor 10 in an operable state for long periods of inactivity, the transmitter 26 is preferably maintained in a dormant state until the controller 16 "awakens" the transmitter 26 in response to the mercury switch 14 activation. Further, maintaining this dormant state allows the vibration sensor 10 and a self contained power source to be hermetically sealed as a single unit. This eliminates the necessity of an external power connection to thereby allow the vibration sensor 10 to be readily located in many small inaccessible locations of a vehicle drive line.

The present invention thus provides a very low cost system for monitoring vibrations and identifying a problem vibration level.

The foregoing description is to be exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive line comprising:
   a drive line component;
   a mercury switch attached to said drive line, said mercury switch activatable by a predetermined vibration in the longitudinal direction of said drive line during operation of said drive line;
   a controller in communication with said mercury switch, said controller operable to identify activation of said mercury switch during operation of said drive line; and
   a warning device in communication with said controller, said warning device activatable by said controller in response to said mercury switch activation.

2. The drive line as recited in claim 1, wherein said drive line includes a shaft defining a longitudinal axis, said mercury switch located along said shaft such that said mercury switch is tilted relative to said longitudinal axis to prevent activation of said mercury switch by a radial acceleration of said drive line.

3. The drive line as recited in claim 1, wherein said controller communicates with said mercury switch only above a predetermined radial acceleration.

4. The drive line as recited in claim 1, wherein said predetermined vibration is a longitudinal acceleration along said drive line.

5. The drive line as recited in claim 1, wherein said warning device is remotely activatable.

6. The drive line as recited in claim 1, further comprising an RF transmitter in communication with said controller, said RF transmitter activatable by said controller to activate said warning device.

7. The drive line as recited in claim 6, wherein said RF transmitter remains dormant until said controllers activates said RF transmitter in response to to said mercury switch activation.

8. A drive line assembly comprising:
   a drive line including a shaft defining a longitudinal axis;
   a mercury switch located along said shaft such that said mercury switch is tilted relative to said longitudinal axis to prevent activation of said mercury switch by a radial acceleration of said drive line, said mercury switch activatable by a predetermined longitudinal acceleration of said shaft indicative of a predetermined vibration in the longitudinal direction during operation of said shaft;
   a controller in communication with said mercury switch said controller operable to identify activation of said mercury switch during operation of said shaft; and
   a warning device in communication with said controller, said warning device activatable by said controller in response to said mercury switch activation.

9. The assembly as recited in claim 8, further comprising an RF transmitter in communication with said controller, said RF transmitter activatable by said controller to remotely activate said warning device.

10. The assembly as recited in claim 8, wherein said controller communicates with said mercury switch only above a predetermined radial acceleration.

11. The assembly as recited in claim 8, wherein said vibration sensor is integral to said shaft.

12. A method of detecting a vehicle drive line vibration during operation of the vehicle comprising the steps of:
   (1) attaching a mercury switch to said drive line, said mercury switch activatable by a predetermined vibration in the longitudinal direction;
   (2) identifying activation of said mercury switch; and
   (3) activating a warning device in response to said mercury switch activation.

13. A method as recited in claim 12, wherein step (3) further comprises sending a signal to remotely activate said warning device.

14. A method as recited in claim 12, wherein said step 1 further includes
   detecting a longitudinal acceleration of said drive line indicative of a predetermined vibration.

15. A method as recited in claim 12, further comprising the step of rotating said drive line above a predetermined radial acceleration.

* * * * *